United States Patent [19]
Hacherl et al.

[11] Patent Number: 5,787,442
[45] Date of Patent: Jul. 28, 1998

[54] CREATING INTEROBJECT REFERENCE LINKS IN THE DIRECTORY SERVICE OF A STORE AND FORWARD REPLICATION COMPUTER NETWORK

[75] Inventors: Donald Joseph Hacherl, North Bend; Tsvi Michael Reiter, Redmond, both of Wash.

[73] Assignee: Microsoft Corporation, Redmond, Wash.

[21] Appl. No.: 678,647

[22] Filed: Jul. 11, 1996

[51] Int. Cl.$^6$ .................................................. G06F 17/30
[52] U.S. Cl. ........................... 707/201; 707/200; 707/10
[58] Field of Search ................................. 707/103, 100, 707/102, 10, 201, 200

[56] References Cited

U.S. PATENT DOCUMENTS

| | | | |
|---|---|---|---|
| 5,185,885 | 2/1993 | Dysart et al. | 707/100 |
| 5,369,778 | 11/1994 | San Soucie et al. | 707/103 |
| 5,410,688 | 4/1995 | Williams et al. | 707/10 |
| 5,481,666 | 1/1996 | Nguyen et al. | 345/357 |
| 5,499,364 | 3/1996 | Klein et al. | 395/200.32 |
| 5,530,852 | 6/1996 | Meske, Jr. et al. | 395/200.36 |
| 5,548,749 | 8/1996 | Kroenke et al. | 707/102 |
| 5,634,124 | 5/1997 | Khoyi et al. | 707/103 |

*Primary Examiner*—Paul R. Lintz
*Attorney, Agent, or Firm*—Workman, Nydegger & Seeley

[57] ABSTRACT

The directory service of the present invention extends the mechanism used to define ordinary properties to define "links," pairs of properties that represent an interobject reference with a certain meaning. Each pair is given a unique "pair ID" and consists of a "link" property and a "backlink" property, which represent the "reference" and "is referenced by" semantics, respectively. Rather than storing interobject references with the referencing and/or the referenced objects themselves and imputing the link, instead the present invention stores the link instance itself as an unnamed object in a link database table, which is separate and distinct from the data information base, and imputes the values to be reported for the relevant properties on the referencing and referenced objects from the existence of records in the link table. When a directory service server learns of the deletion of an object (either via replication or because of a deletion occurring on that server), it removes from its link table all records that refer to that object in either the link ID or backlink ID column, which is an efficient operation. This eliminates any dangling references to the deleted object. Although this implicitly affects the values of the corresponding link and backlink properties on other objects in the directory (i.e., those named in the backlink or link properties of the object being deleted), the changes to those other objects do not need to be noted or replicated in any way, since the replication of the deletion of the original object will cause all other directory service servers to perform the same cleanup, thereby independently removing the same link instances. This allows the directory service to maintain referential integrity in a distributed manner, with minimal replication overhead.

19 Claims, 2 Drawing Sheets

DIRECTORY SCHEMA

| NAME | SYNTAX | ... | PAIR ID | BACKLINK PROPERTY | ... |
|---|---|---|---|---|---|
| SHOE SIZE | INTEGER | ... | -- | -- | ... |
| MANAGER | LINK | ... | 1 | 0 | ... |
| IS MANAGER OF | LINK | ... | 1 | 1 | ... |
| MEMBER | LINK | ... | 2 | 0 | ... |
| IS MEMBER OF | LINK | ... | 2 | 1 | ... |

DIRECTORY INFORMATION BASE ("DIB")

| OBJECT NAME | OBJECT ID | ... | SHOE SIZE | ... |
|---|---|---|---|---|
| JOE | 3 | ... | 11 | ... |
| BOB | 5 | ... | 9 | ... |
| EMPLOYEES | 7 | ... | -- | ... |
| MIKE | 9 | ... | 10.5 | ... |

LINK TABLE

| PAIR ID | LINK ID | BACKLINK ID |
|---|---|---|
| 1 | 5 | 3 |
| 2 | 7 | 3 |
| 2 | 7 | 5 |

DIRECTORY SCHEMA

| NAME | SYNTAX | ... | PAIR ID | BACKLINK PROPERTY | ... |
|---|---|---|---|---|---|
| ⋮ | ⋮ | ⋮ | ⋮ | ⋮ | ⋮ |
| SHOE SIZE | INTEGER | ... | .. | .. | ... |
| ⋮ | ⋮ | ⋮ | ⋮ | ⋮ | ⋮ |
| MANAGER | LINK | ... | 1 | 0 | ... |
| IS MANAGER OF | LINK | ... | 1 | 1 | ... |
| MEMBER | LINK | ... | 2 | 0 | ... |
| IS MEMBER OF | LINK | ... | 2 | 1 | ... |
| ⋮ | ⋮ | ⋮ | ⋮ | ⋮ | ⋮ |

FIG. 1

DIRECTORY INFORMATION BASE ("DIB")

| OBJECT NAME | OBJECT ID | ... | ... | SHOE SIZE | ... |
|---|---|---|---|---|---|
| JOE | 3 | ... | ... | 11 | ... |
| BOB | 5 | ... | ... | 9 | ... |
| EMPLOYEES | 7 | ... | ... | -- | ... |
| MIKE | 9 | ... | ... | 10.5 | ... |

FIG. 2

LINK TABLE

| PAIR ID | LINK ID | BACKLINK ID |
|---|---|---|
| 1 | 5 | 3 |
| 2 | 7 | 3 |
| 2 | 7 | 5 |

FIG. 3 ic # CREATING INTEROBJECT REFERENCE LINKS IN THE DIRECTORY SERVICE OF A STORE AND FORWARD REPLICATION COMPUTER NETWORK

BACKGROUND OF THE INVENTION

1. The Field of the Invention

The invention relates to a directory service in a store and forward replication computer network. More specifically, the invention relates to an improvement to the directory service which allows system administrators to define new reference/is referenced by pairs, maintains referential integrity, minimizes replication overhead, and performs reverse queries in a more efficient manner.

2. Present State of the Art

An important component in any computer system is the directory service, which records information about a set of objects and makes that information available to authorized requesters. The directory can be thought of as the medium through which objects propagate their coordinates to those who might wish to access them or otherwise communicate with them. In a network environment, the task of maintaining the directory is typically divided among several directory service servers acting in cooperation with one another, with each directory service server being logically connected, directly or indirectly, to every other directory service server in the network. As changes are made to the directory on a particular directory service server, that server sends copies of the changes to all of the other directory service servers in the network. This process, called replication, is used to ensure consistency of the information contained in the directory service.

A directory service in its simplest form is a collection of named objects, each of which consists of a collection of distinct properties. While some properties have a simple text string or number as a value (e.g., "Surname" or "Shoe Size"), other properties have as their value the name of, or a reference to, another object in the directory. If the object that is referred to is deleted or renamed, the reference may end up referring to a non-existent object, which is commonly referred to as a "dangling reference." Avoiding dangling references is referred to as "maintaining referential integrity." In the prior art, dangling references are typically dealt with in one of two ways. The first way is simply to allow dangling references to exist on the system and to correct dangling references if, as and when they are encountered. This approach can be irritating to users of the system in that it will result in error messages whenever a user encounters a dangling reference. It can also diminish the confidence end users have in the integrity of the system.

The other approach is to attempt to maintain referential integrity by having an extra piece of code (either part of the directory service or a separate administrative tool) search through the entire directory to find all the objects that reference an object being modified and modify those objects to reflect the first modification. In addition, some servers on a network may only possess read-only replicas of a particular object and, therefore, may not be able to perform the update. Therefore, to correct all possible dangling references, such an approach requires a search, not only of all objects on a particular server, but across the entire network, which is expensive, if not impractical, in terms of both update and replication load.

Another problem inherent in the systems and methods found in the prior art is that they are relatively inefficient when performing "reverse queries," which are designed to determine which objects reference a particular object. Although the reference is a property of the referencing object and the referenced objects can be read directly from that object, it is often advantageous to perform a reverse query to determine which objects reference a named object (as opposed to which objects the named object references). Standard implementations of such reverse queries found in the prior art can be quite expensive to perform in terms of the system resources needed to perform such reverse queries. Here, again, since the identity of referenced objects is a property of the referencing objects in prior art methods and systems, a reverse query requires a network-wide search in order to identify all referencing objects.

Thus, what is needed are improvements to the directory services found in the prior art that allow system administrators to define new reference/is referenced by pairs, maintain referential integrity, minimize replication overhead, and perform reverse queries in a more efficient manner.

SUMMARY AND OBJECTS OF THE INVENTION

It is an object of this invention to provide apparatus and methods for an improved directory service. Additional objects of the invention include providing an improved directory service that allows system administrators to define new reference/is referenced by pairs, providing an improved directory service that maintains referential integrity within a store and forward enterprise in which not all objects are writable at any particular server, providing an improved directory service that minimizes replication overhead, and providing an improved directory service that performs reverse queries in an efficient manner. Additional objects and advantages of the invention will be set forth in the description which follows, and in part will be obvious from the description, or may be learned by the practice of the invention. The objects and advantages of the invention may be realized and obtained by means of the methods and apparatus particularly pointed out in the appended claims.

To achieve the foregoing objects, and in accordance with the invention as embodied and broadly described herein, the directory service of the present invention extends the mechanism used to define ordinary properties to define "links," which are pairs of properties that represent an interobject reference having a certain meaning. Each pair is given a unique pair ID and consists of a link property and a backlink property, which represent the "reference" and "is referenced by" semantics, respectively. Rather than storing interobject references with the referencing and/or the referenced objects themselves and imputing the link, instead the present invention stores the link instance itself as an (unnamed) object in a link database table (called the "link table"), which is separate and distinct from the data information base ("DIB"), and imputes the values to be reported for the relevant properties on the referencing and referenced objects from the existence of records in the link table. The link table has three columns: a pair ID column, a link ID column, and a backlink ID column. Each server holding a replica of an object independently assigns that object an integer object ID, which is unique within the one server's DIB, but is neither unique nor communicated between servers. If a given link property PL and its corresponding backlink property PB are assigned a pair ID equal to "p" and objects X and Y are assigned object IDs equal to "x" and "y," respectively, the existence of the record <p:x:y> in the link table represents the fact that the link property PL on object X has the value Y, and that the backlink property PB on object Y has the value X.

When a directory service server learns of the deletion of an object (either via replication or because of a deletion occurring on that server), it removes from its link table all records that refer to that object in either the link ID column or backlink ID column, which is an efficient operation. This eliminates any dangling references to the deleted object and allows the directory service to maintain referential integrity in a distributed manner, with minimal replication overhead.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 1 is an illustration of a directory schema, represented in the form of a data table;

FIG. 2 is an illustration of a data information base, represented in the form of a data table; and FIG. 3 is an illustration of a link table in accordance with the present invention.

DETAILED DESCRIPTION OF THE PREFERRED EMBODIMENTS

The directory service of the present invention solves the problems that exist in the prior art by extending the mechanism used to define ordinary properties to define "links," which are pairs of properties that represent an interobject reference with a certain meaning. Each pair is given a unique pair ID and consists of a link property and a backlink property, which represent the "reference" and "is referenced by" semantics, respectively.

Each object in the directory is stored as a row in a large database table, called the directory information base ("DIB"), which has a separate column for each defined attribute or property. The set of properties available for use in the directory is controlled by the "directory schema" or "schema," which is a set of property and class definitions. The schema is instantiated as objects in a specified container in the directory, with each object defining a single property or object class. If new objects defining new properties are added to the schema container, directory service servers respond by adding new columns in the data table, and they remove columns in response to objects being deleted. The objects defining these properties themselves consist of properties, such as a unique ID for the property, its syntax (e.g., text string, time, phone number, integer, link, etc.), any value restrictions, etc. The present invention extends this to include an optional pair ID, which is valid only when defining properties of object reference syntax. This allows end users to define new link properties by creating new objects in the schema. This extensibility allows end users to construct arbitrary sets of links. For example, if an administrator wished to implement an organization chart in the directory, the administrator would simply create two new objects in the schema, defining two new properties, "Manager" and "Is Manager Of," giving the two properties the same pair ID, and marking one as the link property and the other as the backlink property. Similarly, to define groups within an organization, such as a list of employees, it is possible to create two new objects in the schema, defining two new properties, "Member" and "Is Member Of," giving the two properties the same pair ID, and marking one as the link property and the other as the backlink property. The directory then makes the newly defined properties available for use on existing objects.

Referring to FIG. 1, relevant portions of the schema are represented in a data table format. Each object type is represented as a separate row, with a separate column for each attribute or property. While only the properties "Name," "Syntax," "Pair ID" and "Backlink ID" are illustrated in FIG. 1 in order to simplify the description of the present invention, it should be understood that the schema typically includes many other attributes to define properties of the various object types or classes. One of the properties depicted in the simplified example shown in FIG. 1 is "Shoe Size," which, as indicated in the "Syntax" column, is an integer. The schema also includes the properties "Manager," "Is Manager Of," "Member" and "Is Member Of," which are defined in the syntax column as "link" properties. It should be readily apparent that the properties "Manager" and "Is Manager Of" are logical complements of one another. Similarly, the properties "Member" and "Is Member Of" are logical complements of each other. As shown in the "Pair ID" column of FIG. 1, the properties of each complementary pair are given the same pair ID. Thus, the properties "Manager" and "Is Manager Of" both have the same pair ID, and the properties "Member" and "Is Member Of" both have the same pair ID. Referring to the "Backlink Property" column in FIG. 1, a "0" value in that column represents that the corresponding property is a link property, and a value of "1" in that column represents that the property is a backlink property." Thus, in the illustrated example, "Manager" and "Member" are both defined as link properties, and "Is Manager Of" and "Is Member Of" are both defined as backlink properties.

For simplicity of discussion, only two examples of links defined in accordance with the present invention are illustrated in FIG. 1. However, it should be appreciated that the present invention allows system administrators readily to create any number of interobject reference definitions, by creating new objects in the schema, that suit the specific needs of a particular system or organization.

Continuing with the example set forth above, if the directory includes objects "Joe," "Bob," "Employees" and "Mike," whose Object IDs are 3, 5, 7 and 9, respectively, then relevant portions of the DIB could be represented as illustrated in FIG. 2. As mentioned previously, each object is represented as a separate row in the DIB, and each property or attribute for the objects is represented as a separate column in the DIB. For simplicity, only the attributes "Object ID" and "Shoe Size" are depicted in FIG. 2, but it should be appreciated that the DIB includes a separate column for each property defined in the schema. Again, for the sake of simplifying the discussion, the object IDs shown in FIG. 2 are illustrated as a single digit integer value; however, it should be appreciated that the object ID is actually of sufficient length to allow each server to uniquely identify each object in that server's DIB.

With the addition of various link property pairs, it is possible, through interobject links, to define relationships between objects having a particular meaning. For example, if Joe is Bob's manager, it is possible to through the use of the "Manager/Is Manager Of" link property pair to define a hierarchical relationship between the objects "Joe" and "Bob." Similarly, if Joe and Bob are both "Employees," it is possible through the use of the "Member/Is Member Of" property pair to define the members of the "Employees" group.

Rather than storing interobject references with the referencing and/or the referenced objects themselves and imputing the link, instead the present invention stores the link instance itself as an unnamed object in a link database table, called the "link table." The link table is separate and distinct from the DIB, and imputes the values to be reported for the relevant properties on the referencing and referenced objects from the existence of records in the link table.

As illustrated in FIG. 3, the link table has three columns: a pair ID column, a link ID column, and a backlink ID column. Each server holding a replica of an object independently assigns that object an integer object ID, which is unique within each server's DIB, but is neither unique nor communicated between servers. If a given link property PL and its corresponding backlink property PB are assigned a pair ID equal to "p" and objects X and Y are assigned object IDs equal to "x" and "y," respectively, the existence of the record <p:x:y> in the link table represents the fact that the link property PL on object X has the value Y, and that the backlink property PB on object Y has the value X.

As the properties of the individual objects are edited, the directory service creates entries in the link table whenever an interobject reference of the type defined in the schema is implemented. Thus, for the examples cited above, the directory service would create entries in the link table to reflect that Bob's manager is Joe and that Joe and Bob are both members of the group of Employees. The relevant portions of the resulting link table are illustrated in FIG. 3. In the first row of the link table represented in FIG. 3, the pair ID value of "1" corresponds to the pair ID value assigned in the schema to the "Manager/Is Manager Of" link pair, the link ID value of "5" corresponds to the object ID of the object "Bob" in the DIB, and the backlink ID value of "3" corresponds to the object ID of the object "Joe" in the DIB. In the second row of the link table, the pair ID value of "2" corresponds to the pair ID value assigned in the schema to the "Member/Is Member Of" link pair, the link ID value of "7" corresponds to the object ID of the object "Employee" in the DIB, and the backlink ID value of "3" corresponds to the object ID of the object "Joe" in the DIB. Similarly, in the third row of the link table, the pair ID value of "2" corresponds to the pair ID value assigned in the schema to the "Member/Is Member Of" link pair, the link ID value of "7" corresponds to the object ID of the object "Employee" in the DIB, and the backlink ID value of "5" corresponds to the object ID of the object "Bob" in the DIB.

If the directory were instructed to read some object, such as the object named "Bob," and return his shoe size and the name of his manager, the directory service would first look up the shoe size and manager attributes in the schema. The schema would reveal that the shoe size attribute is an integer, the value of which actually resides in the corresponding column of the DIB. Through the schema mapping, the directory service would be directed to the correct location in the DIB and would return the proper value (in this example, the value "9"). The schema also reveals that the "Manager" attribute is a link having a pair ID equal to "1" and requiring reference to the link table. To determine the identity of Bob's manager, the directory service then looks in the link table to find any record with a pair ID value equal to "1" (the pair ID for the "Manager/Is Manager Of" link pair) and a link ID value equal to "5" (e.g., the object ID for the object "Bob"). It then takes the object ID listed in the backlink ID column in that row (in this case, "3") and returns to the DIB and determines the name of the object corresponding to that object ID (in this case, "Joe").

Conversely, if the directory were asked to read the "Joe" object and return the names of those individuals whom he manages, then the directory service would locate the "Is Manager Of" attribute in the schema, which would reveal that it is an interobject link, that it has a pair ID equal to "1" and that it is a backlink property. The directory service would then go to the link table and look for a row having a value equal to "1" (the pair ID for the "Manager/Is Manager Of" link pair) in the pair ID column and a value equal to "3" (the object ID for object "Joe") in the backlink ID column and would then return the name of the object corresponding to the object ID located in the link ID column of the corresponding row, which in this example is "Bob." This solves the reverse query problem mentioned above, by making the results of such a query available as a property on the referenced object.

Similarly, if the directory were asked to determine the names of all "Employees," the directory service would first consult the schema and discover that the "Member" attribute is an interobject reference, that it has a pair ID equal to "2" and that it is a link property. It would then scan through the link table looking for any and all rows that include a value equal to "2" (the pair ID for the "Member/Is Member Of" link pair) in the pair ID column and a value equal to "7" (the object ID for the object "Employees") in the link ID column. In the example illustrated in FIG. 3, there are two rows satisfying the foregoing criteria, namely, the second and third rows of the link table. The directory service would then return the names of the objects corresponding to the object IDs appearing in the backlink ID column in the second and third rows of the link table (e.g., "Joe" and "Bob" in this example).

Conversely, if the directory service were asked to determine which groups Bob is a member of, the directory would first consult the schema and determine that the "Is Member Of" attribute is an interobject reference, that is has a paid ID equal to "2" and that it is a backlink property. The directory would then consult the link table and look for any entries having a value equal to "2" (which corresponds to the "Member/Is Member Of" link pair) in the pair ID column and a value equal to "5" (which corresponds to the object ID for the object "Bob") in the backlink ID column. In the example illustrated in FIG. 3, only the third row in the link table satisfies these criteria, and the directory service would return the name of the object corresponding the object ID contained in the link ID column of that row (e.g., "Employees"), indicating that Bob is a member of the group "Employees." Here, again, the present invention satisfies reverse queries in an efficient manner, since each referenced object is directly linked in the link table to the corresponding referencing object. This eliminates having to search the entire directory for objects referencing a particular object in order to perform a reverse query.

The foregoing several examples are directed to queries where the directory is asked to read a named object and return one or more specific properties. It should be appreciated, however, that the directory service is also capable of answering more general forms of queries. For example, it is quite common for the directory to be directed to read a named object and to return all of its properties. Responsive to such a general query, the directory service performs three steps. First, the directory service looks up the object in the DIB and returns all of the values that are actually stored in the DIB and, through the schema mapping, the returned values are properly identified with the properties they represent. Second, the directory service then looks up the object in the link table, looking for all entries in the link table having a link ID equal to the object ID of the named object. For each entry it finds, it uses the pair ID for that entry to look up the property in the schema and reports the name of the object corresponding to the object ID found in the backlink ID column for that entry. Finally, the directory service then looks up the object in the link table, looking for all entries having a backlink ID equal to the object ID of the named object. For each entry it finds, it uses the pair ID for that entry to look up the property in the schema and reports the name of the object corresponding to the object ID found in the link ID column for that entry.

When a directory service server learns of the deletion of an object (either via replication or because of a deletion occurring on that server), it removes from its link table all records that refer to that object in either the Link ID or Backlink ID column. This eliminates any dangling references to the deleted object. This approach is much more efficient than that used in the prior art. As opposed to searching through the entire network-wide directory to eliminate all references to the deleted object, in accordance with the present invention each directory service server simply searches its own locally stored link table and removes any entries that reflect either references to or references by the deleted object.

Although the deletion of an object from the directory implicitly affects the values of the corresponding link and backlink properties on other objects in the directory (i.e., those named in the backlink or link properties of the object being deleted), the changes to those other objects do not need to be noted or replicated in any way. To the contrary, the deletion of an object from one directory service server is replicated out, either directly or indirectly, to all other directory service servers in the enterprise. Replication of the deletion of the original object will then cause all other directory service servers independently to perform the same cleanup function (e.g., removing all entries from that server's link table in which the object ID of the deleted object appears in either the link ID or the backlink ID column), thereby independently removing the same link instances. This allows the directory service to maintain referential integrity in a distributed manner, with minimal replication overhead.

To insure consistency and to avoid conflicts in the interobject reference link between a referencing object and a referenced object, the present invention only permits modifications to be made to entries in the link table by modifying the referencing object (i.e., the object identified in the link ID column of the link table). For example, in the discussion example above in which Joe is Bob's manager, if a change were to occur such that Bob were reassigned to work for Mike, the changes in the interobject reference link would have to be made by modifying the properties of the referencing object. Thus, in the cited example, the changes would have to be made by modifying the "Manager" property of the object "Bob" from "Joe" to "Mike." This would cause the directory service to search the link table for any entries having a value equal to "1" (which corresponds to the "Manager/Is Manager Of" link pair) in the pair ID column and a value equal to "5" (which corresponds to the object "Bob") in the link ID column. Then, the directory service would update any such entries by changing the value in the backlink ID column for any such entry from "5" (the object ID for the object "Joe") to "9" (the object ID for the object "Mike"). As with deletions of objects, modifications to the link table do not need to be replicated across the network. Rather, the modifications to the referencing object (which triggered the resulting modification to the link table) will be replicated, directly or indirectly, to all other directory service servers in the network, which will cause the other directory service servers to make the appropriate modifications to their own link tables.

Embodiments within the scope of the present invention include articles of manufacture comprising program storage means and having encoded therein program code means. Such program storage means can be any available media which can be accessed by a general purpose or special purpose computer. By way of example, and not limitation, such program storage means can comprise RAM, ROM, EPROM, CD-ROM or other optical disk storage, magnetic disk storage or other magnetic storage devices, or any other medium which can be used to store the desired program code means and which can be accessed by a general purpose or special purpose computer. Program code means comprises, for example, executable instructions and data which causes a general purpose or special purpose computer to perform a certain function or functions.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a directory service of a computer-based store and forward replication enterprise, wherein individual data objects are contained in a directory information base in which individual data objects are each identified by an object ID and wherein the individual data objects also have one or more corresponding object properties, a method for establishing interobject cross references between referencing objects and referenced objects contained in the directory, the method comprising the steps of:

creating a directory schema that defines paired links, each paired link representing a relationship between two or more objects and each paired link being identified by a unique pair ID;

locally creating a link database table at each replication location, said link database table having a plurality of individual entries each corresponding to a pair ID so that said link database table contains all relationships which link said objects;

modifying at a replication location one of the corresponding object properties for a data object in the directory information base and replicating the change to other replication locations; and locally updating at each replication location the link database table to reflect the modification.

2. In a directory service of a computer-based store and forward replication enterprise, wherein individual data objects are contained in a directory information base in which individual data objects are each identified by an object ID and wherein the individual data objects also have one or more corresponding object properties, a method for establishing interobject cross references between referencing objects and referenced objects contained in the directory, the method comprising the steps of:

creating a directory schema that defines paired links, each paired link comprising a first link and a second link which represent a relationship between two or more objects and wherein the first and second links are logical complements of one another;

locally creating a link database table at each replication location, said link database table having a plurality of individual entries each corresponding to a link pair so that said link database table contains all relationships which link said objects, each entry identifying the link pair, the object ID of the referencing object, and the object ID of the referenced object;

modifying at each replication location one of the corresponding object properties for a data object in the directory information base and replicating the change to other replication locations; and locally updating at each replication location the link database table to reflect the modification.

3. The method of claim 1 or 2, wherein the step of creating a directory schema comprises the steps of:

modifying the directory schema to define one or more pairs of complementary interobject links, each having a pair ID attribute and a backlink attribute;

assigning to each pair of complementary interobject links a unique pair ID value; and identifying one property of each pair of complementary interobject links as a link property and identifying the other property of each pair of complementary interobject links as a backlink property.

4. The method of claim 3, wherein the step of creating a link database table comprises the step of creating a data table having a separate entry for each instance of an interobject link, each separate entry having a pair ID value corresponding to one of the pair ID values defined in the directory schema, a link ID value identifying the object ID of the referencing object, and a backlink ID value identifying the referenced object.

5. The method of claim 1 or 2 further comprising the step of updating, periodically, the link data table in response to deletion of an object by searching the link data table and deleting any entries in the link data table that include the object ID of the deleted object.

6. In a directory service of a computer-based store and forward replication enterprise, wherein individual data objects are contained in a directory information base in which individual data objects are each identified by an object ID and wherein the individual data objects also have one or more corresponding object properties, a method for establishing interobject cross references between referencing objects and referenced objects contained in the directory, the method comprising the steps of:

modifying a directory schema to define one or more pairs of complementary interobject links, each having a pair ID attribute and a backlink attribute;

assigning to each pair of complementary interobject links a unique pair ID value;

identifying one property of each pair of complementary interobject links as a link property and identifying the other property of each pair of complementary interobject links as a backlink property;

locally creating a link database table at each replication location, said link database table having a separate entry for each instance of an interobject reference, wherein each separate entry in the link database table has a pair ID value corresponding to one of the pair ID values defined in the directory schema, a link ID value identifying the object ID of the referencing object, and a backlink ID value identifying the referenced object;

modifying at a replication location one of the corresponding object properties for a data object in the directory information base and replicating the change to other replication locations; and locally updating at each replication location the link database table to reflect the modification.

7. The method of claim 6, further comprising the steps of:

searching the link database table for each entry identifying the referenced object by the backlink ID value for that entry; and imputing to the referenced object the name of the referencing object identified by the link value ID for that entry.

8. The method of claim 7, further comprising the steps of:

searching the link database table for each entry identifying the referencing object by the link ID value for that entry; and imputing to the referencing object the name of the referenced object identified by the backlink value ID for that entry.

9. The method of claim 7, further comprising the steps of:

searching the link database table for each entry identifying the referenced object by the backlink ID value for that entry; and imputing to the referenced object the name of the referencing object identified by the link value ID for that entry.

10. An article of manufacture for use in connection with a computer-based store and forward replication enterprise, wherein individual data objects are contained in a directory information base in which individual data objects are each identified by an object ID and wherein the individual data objects also have one or more corresponding object properties, the article of manufacture comprising:

a computer usable medium having computer readable program code means embodied in said medium, said computer readable program code means comprising:

means for creating a directory schema that defines paired links, each paired link representing a relationship between two or more objects and each paired link being identified by a unique pair ID;

means locally for creating a link database table at each replication location, said link database table having a plurality of individual entries each corresponding to a pair ID so that said link database table contains all relationships which link said objects;

means for modifying at a replication location one of the corresponding object properties for a data object in the directory information base and replicating the chance to other replication locations; and means for locally updating at each replication location the link database table to reflect the modification.

11. An article of manufacture for use in connection with a computer-based store and forward replication enterprise, wherein individual data objects are contained in a directory information base in which individual data objects are each identified by an object ID and wherein the individual data objects also have one or more corresponding object properties, the article of manufacture comprising:

a computer usable medium having computer readable program code, means embodied in said medium, said computer readable program code means comprising:

means for creating a directory schema that defines paired links each paired link comprising a first link and a second link which represent a relationship between two or more objects and wherein the first and second links are logical complements of one another;

means for creating a link database table at each replication location, each link database table having a plurality of entries each corresponding to link so that said link database table contains all relationships which link said objects, each entry identifying the ink pair, the object ID of the referencing object, and the object ID of the referenced object;

means for modifying at a replication location one of the corresponding object properties for a data object in the directory information base and replicating the change to other replication locations; and means for locally updating at each replication location the link database table to reflect the modification.

12. The article of manufacture of claim 10 or 11, wherein program code means further comprises:

means for modifying the directory schema to define one or more pairs of complementary interobject links, each having a pair ID attribute and a backlink attribute;

means for assigning to each pair of complementary interobject links a unique pair ID value; and means for identifying one property of each pair of complementary interobject links as a link property and identifying the other property of each pair of complementary interobject reference properties as a backlink property.

13. The article of manufacture of claim 12, wherein the means for creating a link database table comprises means for creating a data table having a separate entry for each instance of an interobject link, each separate entry having a pair ID value corresponding to one of the pair ID values defined in the directory schema, a link ID value identifying the object ID of the referencing object, and a backlink ID value identifying the referenced object.

14. The article of manufacture of claim 10 or 11, further comprising:

means for searching the link database table for each entry identifying the referencing object and for imputing to the referencing object the name of the referenced object; and means for searching the link database table for each entry identifying the referenced object and for imputing to the referenced object the name of the referencing object.

15. The article of manufacture of claim 10 or 11, wherein the program code means further comprises means for updating, periodically, the link data table in response to deletion of an object by searching the link data table and deleting any entries in the link data table that include the object ID of the deleted object.

16. An article of manufacture for use in connection with a computer-based store and forward replication enterprise, wherein individual data objects are contained in a directory information base in which individual data objects are each identified by an object ID and wherein the individual data objects also have one or more corresponding object properties, the article of manufacture comprising:

a computer usable medium having computer readable program code means embodied in said medium, said computer readable program code means comprising:

means for modifying a directory schema to define one or more pairs of complementary interobject links, each having a pair ID attribute and a backlink attribute;

means for assigning to each pair of complementary interobject links a unique pair ID value;

means for identifying one property of each pair of complementary interobject links as a link property and identifying the other property of each pair of complementary interobject links as a backlink property;

means for creating a link database table having a separate entry for each instance of an interobject link, wherein each separate entry in the link database table has a pair ID value corresponding to one of the pair ID values defined in the directory schema, a link ID value identifying the object ID of the referencing object, and a backlink ID value identifying the referenced object;

means for modifying at a replication location one of the corresponding object properties for a data object in the directory information base and replicating the change to other replication locations; and means for locally updating at each replication location the link database table to reflect the modification.

17. The article of manufacture of claim 16, further comprising:

means for searching the link database table for each entry identifying the referencing object by the link ID value for that entry; and means for imputing to the referencing object the name of the referenced object identified by the backlink value ID for that entry.

18. The article of manufacture of claim 16, further comprising:

means for searching the link database table for each entry identifying the referenced object by the backlink ID value for that entry; and means for imputing to the referenced object the name of the referencing object identified by the link value ID for that entry.

19. The article of manufacture of claim 16 wherein the computer readable program code means further comprises means for updating, periodically, the link data table in response to deletion of an object by searching the link data table and deleting any entries in the link data table that include the object ID of the deleted object in either the link ID value or the backlink ID value.

* * * * *

UNITED STATES PATENT AND TRADEMARK OFFICE
CERTIFICATE OF CORRECTION

Page 1 of 3

PATENT NO. : 5,787,442
DATED : July 28, 1998
INVENTOR(S) : Donald Joseph Hacherl
Tsvi Michael Reiter It is certified that error appears in the above-identified patent and that said Letters Patent are hereby corrected as shown below:

In the Abstract delete:
"The directory service of the present invention extends the mechanism used to define ordinary properties to define "links," pairs of properties that represent an interobject reference with a certain meaning."

and insert in place thereof the sentence:
--A directory "Schema" is created that defines paired links.--

In the Abstract delete:
"Rather than storing interobject references with the referencing and/or the references objects themselves and imputing the link, instead the"

and insert in place thereof the word --The-- before the word "present"

In the Abstract insert --which stored the objects themselves-- after the word "base" in the following sentence:
"The present invention stores the link instance itself as an unnamed object in a link database table, which is separate and distinct from the data information base, and imputs the values to be reported for the relevant properties on the referencing and references objects from the existence of records in the link table."

UNITED STATES PATENT AND TRADEMARK OFFICE
CERTIFICATE OF CORRECTION

Page 2 of 3

PATENT NO. : 5,787,442
DATED : July 28, 1998
INVENTOR(S) : Donald Hoseph Hacherl Tsvi Michael Reiter It is certified that error appears in the above-identified patent and that said Letters Patent are hereby corrected as shown below:

Title page, item [57],
In the Abstract delete:
"When a directory service server learns of the deletion of an object (either via replication or because of a deletion occurring on that server), it removes from its link table all records that refer to that object in either link ID or backlink ID column, which is an efficient operation. This eliminates any dangling references to the deleted object. Although this implicitly affects the values of the corresponding link and backlink properties on other objects in the directory (i.e., those named in the backlink or link properties of the object being deleted), the changes to those other objects do not need to be noted or replicated in any way, since the replication of the deletion of the original object will cause all other directory service servers to perform the same cleanup, thereby independently removing the same link instances. This allows the directory service to maintain referential integrity in a distributed manner, with minimal replication over head"

insert in place thereof the following sentence:
--If a given link property and its corresponding backlink property are assigned a paid ID equal to "p" and objects X and Y are assigned object IDs equal to "x" and "y," respectively, the existence of the record <p:x:y> in the link table represents the face that the link property on object X has the value Y, and that the backlink property on object Y has the value X.--

Column 3, line 21, insert --s-- after the word "drawing"

Column 10, line 67, delete "," after the word "code"

UNITED STATES PATENT AND TRADEMARK OFFICE
CERTIFICATE OF CORRECTION

PATENT NO. : 5,787,442
DATED : July 28, 1998
INVENTOR(S) : Danald Joseph Hacheri
Tsvi Michael Reiter It is certified that error appears in the above-identified patent and that said Letters Patent is hereby corrected as shown below:

Column 11, line 12, delete the word "ink" and insert --link--

Signed and Sealed this

Eleventh Day of April, 2000

Attest:

Q. TODD DICKINSON

Attesting Officer

Director of Patents and Trademarks